Feb. 26, 1963  W. DYCK  3,079,052
LIQUID METERING DEVICE
Filed April 4, 1960  3 Sheets-Sheet 1

INVENTOR:
WALTER DYCK
BY
Michael S. Striker
his ATTORNEY

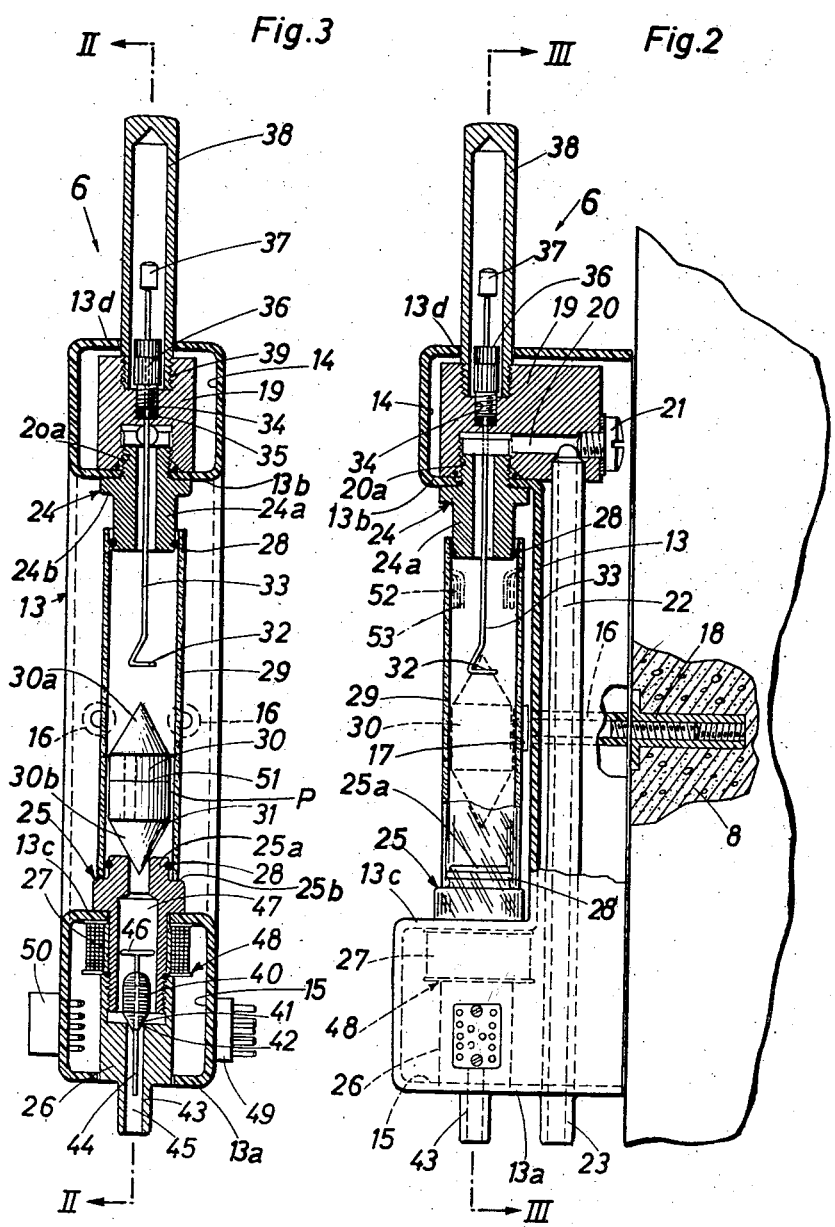

Feb. 26, 1963

W. DYCK 3,079,052

LIQUID METERING DEVICE

Filed April 4, 1960

INVENTOR:
WALTER DYCK

BY
*Michael S. Striker* his ATTORNEY

# United States Patent Office 3,079,052
Patented Feb. 26, 1963

3,079,052
LIQUID METERING DEVICE
Walter Dyck, Munich, Germany, assignor to Agfa Aktiengesellschaft, Leverkusen-Bayerwerk, Germany
Filed Apr. 4, 1960, Ser. No. 19,786
Claims priority, application Germany Apr. 10, 1959
13 Claims. (Cl. 222—434)

The present invention relates to liquid metering devices in general, and more particularly to liquid metering devices of the type which, among many other uses, are especially suitable for supplying measured quantities of a regenerating solution into developing tanks for films, plates, papers and the like.

Many types of devices adapted to deliver measured quantities of a liquid, either per weight or per volume, are already known in the art. Such metering devices are already utilized for delivering controlled quantities of a regenerating solution to a suitable valve and through the latter into a photochemical developing tank or the like. A known metering device comprises a diaphragm and eventually a spring adapted to determine the exact weight of a liquid column in that a column of predetermined weight actuates an electric switch to close an inlet valve and to prevent further delivery of the liquid. It is also known to utilize a float valve which, after permitting the delivery of a given liquid quantity into its housing, will seal the intake end of the housing to prevent inflow of additional liquid material. The discharge of metered liquid normally occurs at fixed intervals with the help of a synchronized mechanism or a time switch.

A serious drawback of presently utilized liquid metering devices is that they invariably permit contact of the liquid with the surrounding atmospheric air. Thus, when the liquid is a chemical solution intended for use in the processing of exposed films and the like, a chemical reaction takes place in the metering device and the solution may become inactive before reaching the developing tank. In addition, all known liquid metering devices are rather complicated and hence expensive in that they normally require at least two valves whose operation must be synchronized.

An important object of the present invention is to provide a very simple, reliable and accurate liquid metering device which is constructed and assembled in such a way that the metered liquid is always sealed from atmospheric air.

Another object of the invention is to provide a liquid metering device of the just outlined type whose liquid metering element may remain in permanent communication with the liquid source, i.e. even at such times when the metered liquid is discharged from the apparatus.

A further object of the invention is to provide a liquid metering device which may be readily adapted for measuring different quantities of liquids.

An additional object of the instant invention is to provide a metering device of the above outlined characteristics which is constructed and assembled in such a way that it may be readily adjusted for measuring different quantities of a liquid substance without requiring any interchange of its component parts.

A concomitant object of the invention is to provide a metering device for liquids which consists of a small number of component parts and which may be utilized for metering of practically all types of liquid substances.

With the above objects in view, the invention resides in the provision of a metering device which comprises essentially an upright tubular metering element containing a vertically reciprocable float which defines a flow restricting passage for the liquid. The metering device further comprises a preferably adjustable stop which extends into the metering element to limit the upward movement of the float and a valve or the like which releasably seals the discharge opening of the metering element. When the discharge opening of the metering element is closed, liquid flows through the aforementioned passage beneath the float and the latter rises toward and into abutment with the stop. When the discharge opening of the metering element is exposed, the liquid is discharged therethrough and the float descends in a direction away from the stop, the cross-sectional area of the metering element multiplied by the distance covered by the float determining the quantity of discharged liquid. The metering device may be actuated by a time switch over a preferably magnetic valve which permits periodical discharge of liquid from the metering element. During such discharge, the float descends and, in its lowermost position, preferably seals the discharge opening of the metering element.

The novel features which are considered as characteristic of the invention are set forth in particular in the appended claims. The invention itself, however, both as to its construction and its method of operation, together with additional objects and advantages thereof, will be best understood from the following detailed description of a specific embodiment when read in connection with the accompanying drawings, in which:

FIG. 2 is an enlarged central vertical section through a single liquid metering device, the section being taken along the line II—II of FIG. 3, as seen in the direction of arrows;

FIG. 3 is a section taken along the line III—III of FIG. 2, as seen in the direction of arrows.

Figure 1:
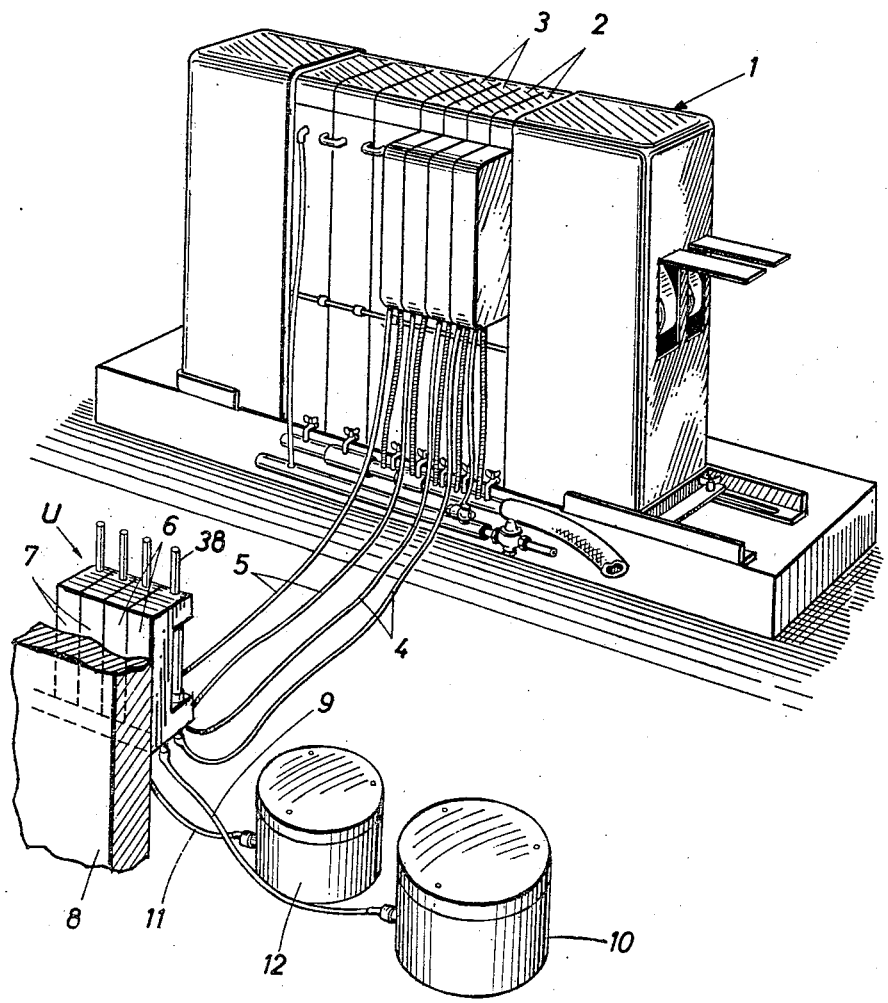
FIG. 1 is a perspective view of four liquid metering devices embodying my invention, each being connected to a source of liquid and with a tank of a roll film developing and processing apparatus.

Referring now in greater detail to the drawings, and first to FIG. 1, there is shown a roll film developing and processing apparatus 1 whose pairwise arranged developing and fixing tanks 2, 3 are connected to liquid metering devices 6, 7 through two pairs of flexible conduits 4, 5, respectively. The exact construction of the apparatus 1 forms no part of this invention; it is shown merely as representing one type of apparatus which may be advantageously combined with liquid metering devices embodying the invention.

The liquid metering devices 6, 7 are preferably fixed to the upright wall 8 of a laboratory room or the like. The metering devices 6 which deliver a solution to the developing tanks 2 are connected with a liquid source 10 through a conduit shown as a flexible hose 9, and a similar liquid source 12 is connected through a further flexible conduit 11 with the second pair of liquid metering devices 7 which control the supply of a fixing solution to the tanks 3. The liquid sources 10, 12 preferably assume the form of overhead reservoirs which are adapted to constantly deliver liquid by gravity flow.

The construction of all liquid metering devices 6, 7 is identical and one thereof, i.e. a metering device 6 for the developing solution, is shown in full detail in FIGS. 2 and 3. This device comprises a tub- or trough-shaped housing or frame 13, preferably consisting of a suitable synthetic plastic material, which defines an upper and a lower chamber 14, 15, respectively. The open side of the frame 13 faces the laboratory wall 8. The connection between the frame 13 and the wall 8 comprises a pair of sleeves 16 (FIG. 3) each of which is rigidly fixed to the part 13 and accommodates a threaded bolt 17 which extends into an internally threaded socket 18 embedded in the material of the wall 8.

The upper chamber 14 receives a header 19 formed with a bore 20 whose open rear end is sealed by a screw 21. The bore 20 communicates with the upper or discharge end of a supply tube 22, the latter's intake nipple 23 extending through the bottom wall 13a of the lower chamber 15 and being connected to the conduit 9 so as to constantly deliver a developing solution from the reservoir 10 into the bore 20. Alternately, the intake nipple 23 may be connected to a distributor or header which delivers developing solution to two or more metering devices. The header 19 has a tapped vertical bore 20a which communicates with the horizontal bore 20 and receives the externally threaded intake end of a hollow tubular screw socket member 24, the latter passing through an aperture formed in the bottom wall 13b of the upper chamber 14. The upper wall 13c of the lower chamber 15 is formed with an aperture which is vertically aligned with the aperture in the wall 13b and receives the reduced lower half of a second hollow tubular screw socket member 25. The externally threaded lower end portion of the member 25 is screwed into the hollow housing 26 of a magnetic valve 48. The upper end portion of the valve housing 26 carries a coaxial magnetic coil 27.

The socket member 24 has a downwardly extending comparatively long nipple 24a which is coaxial with a somewhat shorter upwardly extending nipple 25a of the lower socket member 25. A sealing ring 28 of rubber or a like resilient material is disposed about each nipple to seal the intake and discharge ends of an upright tubular metering element 29 which extends between and is coaxial with the nipples 24a, 25a. The socket member 25, the block 19, the tube 22 and the conduit 9 connect the metering element 29 with the liquid source 10 by exclusion of atmospheric air. As is best shown in FIG. 3, the metering element 29 normally rests on the shoulder 25b of the hollow member 25 adjacent to the lower end of the nipple 25a, and its upper end is normally spaced from the shoulder 24b formed between the body of the upper socket member 24 and its nipple 24a. The distance between the upper end of the metering element 29 and the shoulder 24b exceeds the height of the lower nipple 25a; therefore, by pushing it in upward direction into actual abutment with the shoulder 24b, the metering element 29 may be readily removed from the liquid metering device 6 for the purpose of cleaning or to be replaced by a differently configurated and/or dimensioned metering element. The metering element preferably consists of glass or of a transparent synthetic plastic substance. It will be seen that the nipples 24a, 25a constitute supporting and retaining means for the metering element and at the same time define liquid introducing and evacuating passages which communicate with the interior of the element 29. It is equally possible to form the lower socket member 25 as an integral part of the metering element; the discharge opening of the member 25 then constitutes the discharge opening of the element 29.

A float 30 is vertically reciprocable and has a certain amount of lateral play in the bore of the metering element 29 i.e. the diameter of the float 30 is slightly less than the diameter of the bore in the element 29 whereby the liquid delivered from the source 10 through the tube 22, through the bore 20 of the header 19, and through the hollow upper socket member 24 is free to flow at a reduced speed through the flow-restricting passage P formed about the float 30 and lifts the latter to the extent permitted by an adjustable stop 33. Instead of providing an annular passage P about the float 30, it is possible to provide a composite passage consisting of one or more bores formed in the float and the latter is then rather snugly fitted for vertically reciprocating movements in the metering element 29. The float 30 is formed with upper and lower conical end portions 30a, 30b, respectively, the latter of which is adapted to move against a seat 31 provided in the intake end of the nipple 25a to seal the passage for liquid leading from the discharge end of the metering element 29 into the enlarged cavity 47 in the lower socket member 25. The discharge end of the member 25 is releasably sealed by the magnetic valve 48 which will be described in full detail hereinafter.

The stop 33 consists of a length of wire, or it may assume the shape of a vertical rod having at its lower end a loop 32 which serves as an abutment for the conical upper end portion 30a of the float 30 (see FIG. 2). The wire or rod 33 is coaxial with the metering element 29 and extends upwardly through the latter's intake end and through a bore 34 formed in the header 19 to terminate in a hand-grip member which is formed as a knob 37, the latter being protected by a cap 38 whose externally threaded portion 39 is screwed into the enlarged upper end of the bore 34 and which projects upwardly through an aperture provided in the upper end wall 13d of the chamber 14. Upon removal of the cap 38, an operator may grasp the knob 37 to adjust the position of the loop 32 so as to change the distance which the float 30 may cover between its uppermost position (FIG. 2) and the lowermost position of FIG. 3 in which its lower cone 30b abuts against the valve seat 31. To prevent entry of atmospheric air, the bore 34 preferably receives a resilient annular pad 35 made of rubber or the like which is formed with a passage for the wire or rod 33 and is compressed by a screw socket 36 to tightly seal the narrow passage between the bores 20 and 34. The member 33 extends through the coaxial bore of the socket 36. The compressed pad 35 simultaneously holds the wire 33 in its momentary position and counteracts the buoyancy of the float 30 when the latter's upper cone 30a comes into abutment with the loop 32.

The magnetic valve 48 in the chamber 15 comprises a soft-iron armature 40 whose exterior surface is vulcanized and which is formed with a downwardly extending conical end portion 41 receivable in the seat 42 of the valve housing 26. The downwardly extending discharge nipple 43 of the valve housing 26 projects through an aperture in the bottom wall 13a and terminates at the level of the inlet nipple 23. The armature 40 is coaxially traversed by an acid-resistant guide member or wire 44 whose lower portion extends into the coaxial bore 45 of the valve housing 26 and whose upper end portion constitutes a loop or eye 46 slidable in cylindrical cavity 47 of the lower socket member 25. The socket member 25 and the valve housing 26 together form a composite tubular member having a channel including the cavity 47 and the bore 45 whose intake end in the nipple 25 communicates with the lower end of the metering element 29. The smallest cross-sectional area of this channel is always (and preferably substantially) larger than the maximum cross-sectional area of the passage P.

The magnetic valve 48 may be operated at predetermined time intervals by a non-represented time switch or the like which periodically completes the electric circuit of the coil 27. It is often desirable to combine the actuating means for the magnetic valves of two or more liquid metering devices so that the latter may constitute a multi-piece unit U comprising several prefabricated components, such as is shown in FIG. 1 of the drawings. Each liquid metering device is then provided with a multi-pole plug 49 and with a multi-pole socket 50, the plug of one metering device being insertable into the socket of the adjacent metering device so that the unit U consisting of say four metering devices requires only a single connection to the time switch.

FIG. 3 shows the metering device in a position immediately after the discharge of a measured liquid quantity is completed, i.e. when the coil 27 of the magnetic valve 48 is deenergized and its armature 40 seals the bore 45 from the cavity 47 in the channel of the composite tubular member 25, 26. When this valve is in energized condition, the coil 27 attracts its armature 40 and the latter's conical end portion 41 moves upwardly and away from the valve seat 42 to permit the flow of liquid from the cavity 47 into the bore 45 and into the discharge nipple 43. Since the source 10 of a regenerating solution is always connected with the intake or upper end of the metering element 29, the float 30 begins to rise as soon as the valve 48 is deenergized and moves toward and finally into abutment with the loop 32 of the stop means 33 (see FIG. 2). The liquid now fills the entire metering element 29 above and below the float 30 because it is free to flow through the restricting passage P. The liquid also fills the cavity 47 in the lower socket member 25. When the non-represented time switch again energized the coil 27 of the valve 48, the armature 40 is lifted away from the seat 42 and the float 30 begins to sink at the speed corresponding to the speed of surrounding liquid until it reachese the position of FIG. 3 in which its cone 30b seals the intake end of the hollow socket member 25 by coming to rest against the valve seat 31. The quantity of liquid delivered to the developing tank equals the cross section of the bore in the metering element multiplied by the distance covered by the float 30 between its positions of FIGS. 2 and 3. Of course, it is equally possible to deenergize the coil 27 of the valve 48 before the lower cone 30b of the float 30 reaches the valve seat 31, i.e. the float need not necessarily reach its lowermost position when the discharge of liquid is interrupted. In fact, an operative connection may be provided between the float in a given position and the magnetic valve 48 so that the latter will prevent further discharge of liquid when the float reaches a predetermined point during its travel in a direction away from the stop 33. As stated hereinabove, the cross-sectional area of the passage P should be smaller than the smallest cross-sectional area of the liquid channel beneath the valve seat 31, i.e. the liquid should be free to flow from the metering element at a rate faster than its rate of flow through the passage P. If the passage P is comparatively small, it is advisable to utilize the metering device in connection with liquids of low viscosity.

The metering element may be provided with a series of graduations permitting visual determination of metered liquid quantities. A marker, e.g. a ring 51, may be provided on the float 30 to facilitate the reading of the scale on the metering element. Instead of adjusting the position of the stop 33, the quantity of metered liquid may be altered by replacing the metering element 29 with a metering element of different diameter. For example, FIG. 2 shows in phantom lines portions of two metering elements 52, 53 of progressively diminishing diameters each of which may replace the element 29 and each of which carries a differently calibrated scale.

Figure 4:
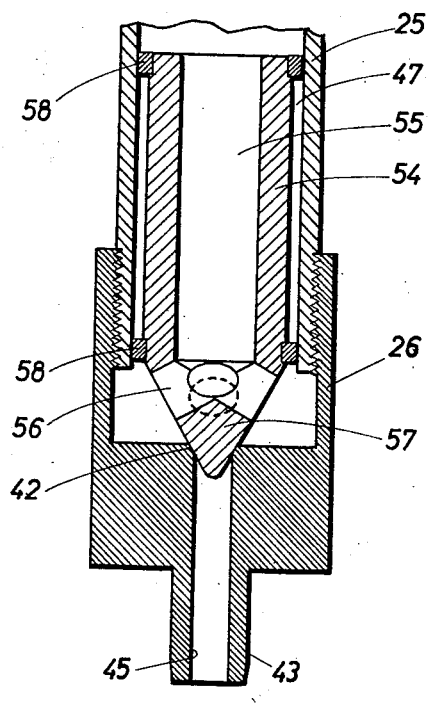
FIG. 4 is a greatly enlarged axial section through the armature of a magnetic valve which may be utilized in the metering device of FIGS. 2 and 3.

FIG. 4 illustrates a modified armature for the magnetic valve 48 which may replace the armature 40 and the guide means 44, 46 of FIG. 3. This armature comprises a hollow tubular body member 54 which resembles a projectile and whose lower end assumes the shape of a cone 57 adapted to sealingly abut against the valve seat 42 in the valve housing 26. The axial bore 55 of the member 54 communicates at its lower end with say four preferably uniformly spaced and slightly inclined radial discharge orifices 56 which permit the flow of a liquid from the bore 55 into the bore 45 when the armature is moved upwardly and away from the valve seat 42. Thus, instead of providing an annular passage with the surrounding lower end portion of the socket member 25 as in the embodiment of FIG. 3, the modified armature provides a liquid passage therewithin (bore 55), the annular space between the member 54 and the socket member 25 being sealed by a pair of guide rings 58 made of rustproof steel or the like. The member 54 has a vulcanized surface so that its material cannot react with the developing solution. When the magnetic valve is deenergized, the armature assumes the position of FIG. 4 whereby its cone 57 prevents the discharge of liquid into the bore 45.

Without further analysis, the foregoing will so fully reveal the gist of the present invention that others can, by applying current knowledge, readily adapt it for various applications without omitting features that, from the standpoint of prior art, fairly constitute essential characteristics of the generic and specific aspects of this invention and, therefore, such adaptations should and are intended to be comprehended within the meaning and range of equivalence of the following claims.

What is claimed as new and desired to be secured by Letters Patent is:

1. A liquid metering device comprising, in combination, a source of liquid; header means communicatively connected with said source and having vertical bore means; a first hollow member fixed to and extending downwardly from said header means, said member having a liquid admitting bore communicating with said bore means; an upright tubular metering element having a liquid admitting upper end sealingly connected to said first hollow member and a lower end; a second hollow member sealingly received in the lower end of said metering element, said second hollow member having an intake end communicating with the interior of said metering element and a discharge end; means for releasably sealing the discharge end of said second hollow member; a float vertically reciprocably received in the metering element, said float movable into a lowermost position in which it seals the intake end of said second hollow member and defining a passage with the metering element whereby the liquid flows from said source, through said header means and said first member and beneath the float and the latter is moved in upward direction when the discharge end of said second hollow member is sealed; stop means comprising a rod coaxially extending through said vertical bore means and through the bore of said first member into said metering element and having a lower end providing abutment means for said float; a handgrip member connected to said rod above said header for axially reciprocating the rod with respect to said metering element; and resilient means received in the vertical bore means of said header for sealing the liquid from atmospheric air and for yieldably holding said rod, said float descending toward and into said lowermost position to permit discharge of a metered quantity of liquid when the discharge end of said second hollow member is exposed.

2. A liquid metering device comprising, in combination, a fixed frame; a source of liquid; an upper and a coaxial lower hollow member supported by said frame; said upper member connected with said source and having a downwardly extending nipple, said lower member having a discharge end and an upwardly extending nipple formed with an intake end; valve means releasably sealing the discharge end of said lower member; an upright tubular metering element having an intake end surrounding the nipple of said upper member and a discharge end surrounding the nipple of said lower member; sealing rings provided between each nipple and said metering element for preventing communication of air with the liquid flowing through said upper member and into said metering element; a float vertically reciprocably received in said metering element, said float movable into a lowermost position in which it seals the intake end of the nipple on said lower member and defining a passage with the metering element whereby the liquid flows beneath the float and the latter is moved in upward direction when the discharge end of said lower member is sealed; and stop means extending downwardly through the intake end of said metering element for limiting the upward movement of said float, said float descending toward and into said lowermost position to permit evacuation of metered quantities of a liquid from said metering element when the discharge end of said lower member is open.

3. A liquid metering device comprising, in combination, a source of liquid; an upright tubular metering element having an upper end connected to said source and a lower end; a hollow member sealingly received in the lower end of said metering element, said member having a bore with an intake end in communication with the interior of said metering element, a valve seat surrounding said intake end, and a discharge end; means for releasably sealing the discharge end of said member comprising a magnetic valve having a housing coaxially fixed to said member and defining a valve seat, a coil mounted on said housing, a vertically reciprocable armature having a vulcanized surface and received in the bore of said member, said armature movable into sealing position in which it abuts against said last mentioned valve seat to prevent the evacuation of liquid through said member and adapted to be attracted by said coil to move away from said sealing position, and means connected with said armature and slidable in the bore of said member for guiding the armature into and from said sealing position; a float vertically reciprocably received in said metering element, said float movable into a lowermost position in which it abuts against said first mentioned valve seat and seals the intake end of said member and defining a passage with said metering element whereby the liquid flows beneath the float and the latter is moved in upward direction when the armature is in said sealing position; and stop means extending through the intake end of said metering element for limiting the upward movement of said float, said float descending toward and into said lowermost position to permit discharge of a metered quantity of liquid from said metering element when the armature is attracted by said coil.

4. A liquid metering device comprising, in combination, a source of liquid; an upright tubular metering element having an upper end connected to said source and a lower end; a hollow member sealingly received in the lower end of said metering element, said member having a bore with an intake end in communication with the interior of said metering element, a valve seat surrounding said intake end, and a discharge end; means for releasably sealing the discharge end of said member comprising a magnetic valve having a housing coaxially fixed to said member and defining a valve seat, a coil mounted on said housing and a vertically reciprocable armature in the bore of said member having a vulcanized outer surface and a conical lower end portion, said armature movable into sealing position in which its conical end portion rests upon said last mentioned valve seat to prevent the evacuation of liquid through said member and adapted to be atracted by said coil to move away from said sealing position; a float vertically reciprocably received in said metering element, said float movable into a lowermost position in which it abuts against said first mentioned valve seat and seals the intake end of said member and defining a passage with said metering element whereby the liquid flows beneath the float and the latter is moved in upward direction when the armature is in said sealing position; and stop means extending through the intake end of said metering element for limiting the upward movement of said float, said float descending toward and into said lowermost position to permit discharge of a metered quantity of liquid from said metering element when the armature is attracted by said coil.

5. A liquid metering device comprising, in combination, a source of liquid; an upright tubular metering element having an upper end connected to said source and a lower end; a hollow member sealingly received in the lower end of said metering element, said member having a bore with an intake end in communication with the interior of said metering element, a valve seat surrounding said intake end, and a discharge end; means for releasably sealing the discharge end of said member comprising a magnetic valve having a housing coaxially fixed to said member and defining a valve seat, a coil surrounding said housing, a vertically reciprocable armature received in the bore of said member, said armature consisting of a hollow cylindrical body having a conical lower end portion, a coaxial bore terminating at said conical end portion and at least one orifice above said conical end portion and communicating with said last mentioned bore, said conical end portion movable into sealing position in which it abuts against said last mentioned valve seat to prevent the flow of liquid through said member, and at least one acid resistant ring surrounding said armature for guiding the same in the bore of said member, said armature adapted to be attracted by said coil to move its conical end portion away from said last mentioned valve seat; a float vertically reciprocably received in said metering element, said float movable into a lowermost position in which it abuts against said first mentioned valve seat and seals the intake end of said member and defining a passage with said metering element whereby the liquid flows beneath the float and the latter is moved in upward direction when the armature is in said sealing position; and stop means extending through the intake end of said metering element for limiting the upward movement of said float, said float descending toward and into said lowermost position to permit discharge of a metered quantity of liquid from said metering element when the armature is attracted by said coil.

6. A liquid metering device comprising, in combination, a source of liquid; an upright tubular metering element having an upper end connected to said source and a lower end; a hollow member sealingly received in the lower end of said metering element, said member having a bore with an intake end in communication with the interior of said metering element, a valve seat surrounding said intake end, and a discharge end, means for releasably sealing the discharge end of said member comprising a magnetic valve having a housing coaxially fixed to said member and defining a valve seat, a coil mounted on said housing, a vertically reciprocable armature having a vulcanized surface and received in the bore of said member, said armature movable into sealing position in which it abuts against said last mentioned valve seat to prevent the evacuation of liquid through said member and adapted to be attracted by said coil to move away from said sealing position, and means consisting of acid-resistant material, coaxially traversing said armature, and having a portion slidably engaging with said member for guiding the armature in its movements toward and away from said last mentioned valve seat; a float vertically reciprocably received in said metering element, said float movable into a lowermost position in which it abuts against said first mentioned valve seat and seals the intake end of said member and defining a passage with said metering element whereby the liquid flows beneath the float and the latter is moved in upward direction when the armature is in said sealing position; and stop means extending through the intake end of said metering element for limiting the upward movement of said float, said float descending toward and into said lowermost position to permit discharge of a metered quantity of liquid from said metering element when the armature is attracted by said coil.

7. A liquid metering device comprising, in combination, a source of liquid; an upright tubular metering element having an upper end connected to said source and a lower end defining a discharge opening; means for releasably sealing said discharge opening; a float reciprocably received in said element and defining a passage therewith whereby the liquid flows beneath the float and the latter is moved upwardly in said element when said discharge end is closed, the cross-sectional area of said passage being selected in such a way that the rate of liquid flow through said passage is less than the rate at which the liquid may be evacuated through said discharge opening whereby the float descends in said element when the latter's discharge end is opened to an extent sufficient to permit evacuation of liquid at a rate higher than the rate at which liquid may flow through said passage; and stop means for limiting the upward movement of said float.

8. A device for discharging metered quantities of a liquid from a liquid source, comprising in combination, an upright tubular metering element having a liquid admitting upper end adapted to be connected with the liquid source and a liquid discharging lower end; a hollow member connected with the lower end of said metering element and formed with a liquid evacuating channel communicating with the interior of said element; openable and closable valve means for controlling the flow of liquid from said element through said channel; a float reciprocably received in said element and defining a passage through which the liquid may flow from said upper end beneath the float to lift the float above said member, the cross-sectional area of said passage being smaller than the smallest cross-sectional area of said channel in the open position of said valve means, said float movable by gravity into sealing engagement with said member upon evacuation of liquid contained in said element beneath the float when the valve means permits the flow of liquid from said element at a rate faster than the rate at which liquid can flow through said passage whereby a metered quantity of liquid is evacuated from said element before the float moves into sealing engagement with said member.

9. A device for discharging metered quantities of a liquid from a liquid source, said device comprising, in combination, an upright tubular metering element having a liquid admitting upper end connectable to the liquid source and a liquid evacuating lower end; a float reciprocably received in and defining in said element at least one passage for the flow of liquid from said upper end to said lower end; liquid evacuating means sealingly connected to and formed with channel means communicating with said lower end, the maximum cross-sectional area of said passage being smaller than the minimum cross-sectional area of said channel means; and valve means provided in said evacuating means for controlling the flow of liquid from said element, said device operating in such a way that, when said upper end is connected with the liquid source and said valve means is closed, the liquid flows through said passage to accumulate in said element beneath and to cause an upward movement of said float, and the float descending by gravity toward said lower end when the valve means is open to such an extent that the evacuation of liquid from said element occurs at a rate faster than the rate of liquid flow through said passage whereby a metered quantity of liquid accumulated in said element beneath the float is evacuated during the descent of said float through a predetermined distance in said element.

10. A device for discharging metered quantities of a liquid from a liquid source, comprising in combination, an upright tubular metering element having a liquid evacuating lower end and a liquid admitting upper end connectable to the liquid source so that the liquid may flow continuously through the upper end of and into said element; means for evacuating the liquid at a predetermined rate through the lower end of said element; means for moving said evacuating means between a liquid evacuating and a sealing position; and a float reciprocably arranged within and defining in said element at least one passage for the flow of liquid from said upper end to said lower end, said passage having a cross-section of such area as to permit the flow of liquid at a rate lower than said predetermined rate of liquid flow from said element in the evacuating position of said evacuating means whereby the float descends by gravity in and a metered quantity of liquid is evacuated from said element when said evacuating means is moved to its evacuating position to permit the descent of said float through a predetermined distance in said element.

11. A device for discharging metered quantities of a liquid from a liquid source, comprising in combination, an upright tubular metering element having a liquid evacuating lower end and a liquid admitting upper end connectable to the liquid source so that the liquid may flow continuously through said upper end and into said element; means for evacuating the liquid at a predetermined rate through the lower end of said element; means for moving said evacuating means between a liquid evacuating and sealing position; a float reciprocably arranged within and defining in said element at least one passage for the flow of liquid from said upper end to said lower end, said passage having a cross-section of such area as to permit the flow of liquid at a rate lower than said predetermined rate of liquid flow from said element in the evacuating position of said evacuating means whereby the float descends by gravity in and a metered quantity of liquid is evacuated from said element when said evacuating means is moved to its evacuating position to permit the descent of said float through a predetermined distance in said element; and stop means comprising an adjustable member extending into said element for limiting the upward movement of said float.

12. A device as set forth in claim 11, wherein said stop means comprises a wire like member extending downwardly through the upper end of said element and having a lower end providing abutment means for said float, and means connected with said wire like member externally of said element for axially moving the last named member with respect to said element whereby to control the distance through which the float may reciprocate in said element.

13. A device as set forth in claim 11, wherein said metering element consists of transparent material to permit observation of said adjustable member.

References Cited in the file of this patent

UNITED STATES PATENTS

| | | |
|---|---|---|
| 583,736 | Eppich | June 1, 1897 |
| 1,233,937 | Twigg et al. | July 17, 1917 |
| 1,542,036 | Conrader | June 16, 1925 |
| 2,343,847 | Swann | Mar. 7, 1944 |
| 2,591,288 | Pitchford | Apr. 1, 1952 |

FOREIGN PATENTS

| | | |
|---|---|---|
| 1,033,070 | Germany | June 26, 1958 |